United States Patent [19]

Ueno

[11] 4,452,838
[45] Jun. 5, 1984

[54] HEAT-SHRINKABLE TUBES

[75] Inventor: Keiji Ueno, Osaka, Japan

[73] Assignee: Sumitomo Electric Industries, Ltd., Osaka, Japan

[21] Appl. No.: 411,383

[22] Filed: Aug. 25, 1982

[30] Foreign Application Priority Data

Aug. 25, 1981 [JP] Japan .................. 56-133676

[51] Int. Cl.³ ............................................. C08F 2/46
[52] U.S. Cl. ........................... 428/36; 204/159.17; 204/159.2; 525/85; 174/DIG. 8
[58] Field of Search ............... 204/159.2, 159.17; 525/85; 174/DIG. 8; 428/36

[56] References Cited

U.S. PATENT DOCUMENTS

| 3,040,385 | 6/1962 | Folta ................................. 156/229 |
| 3,580,829 | 5/1971 | Lanza ............................ 204/159.17 |
| 3,644,578 | 2/1972 | Mathieu et al. ...................... 525/85 |
| 3,705,210 | 12/1972 | Mathieu et al. ..................... 525/85 |
| 3,767,606 | 10/1973 | Kishikawa et al. .................. 525/85 |
| 4,220,730 | 9/1980 | Coyne ............................. 204/159.2 |

FOREIGN PATENT DOCUMENTS 48-18573  7/1973  Japan .................. 525/85

Primary Examiner—William R. Dixon, Jr.
Attorney, Agent, or Firm—Sughrue, Mion, Zinn, Macpeak & Seas

[57]  ABSTRACT

A heat-shrinkable tube is described. The tube is characterized by a resin composition which contains from 5 to 80% by weight of a graft copolymer, and chlorinated polyethylene having a crystal proportion of from 1 to 25%. The graft copolymer is prepared by graft-copolymerizing polyvinyl chloride to an ethylene-vinyl acetate copolymer having a vinyl acetate content of at least 50% by weight.

11 Claims, No Drawings

HEAT-SHRINKABLE TUBES

FIELD OF THE INVENTION

The present invention relates to heat-shrinkable tubes having excellent flame-retardant properties and transparency.

BACKGROUND OF THE INVENTION

Heat-shrinkable tubes are used in various applications, for example, for the covering of joints of electric wires or cables, the terminal processing of wires in various equipments, or for the prevention of corrosion of steel pipes. When heat-shrinkable tubes are used for the connection or terminal processing of wires in equipments, or for the covering of condensers, they must excellent transparency so that the connection can be seen or so that the type of equipment used can be determined easily. Furthermore, when they are used in such applications, they must meet the requirements for flame-retardant properties as specified in UL Standards. Heat-shrinkable tubes for use in such applications, therefore, are required to have high flame retardant properties.

Conventional heat shrinkable tubes composed of polyvinylidene fluoride (U.S. Pat. No. 3,580,829) and of polyesters, e.g., Mylar (U.S. Pat. No. 3,040,385) whose cristallinity is high have flexibility and transparency poorer than those composed of a polyvinyl chloride (PVC).

Thus, in the field including the above-described applications, heat-shrinkable tubes made of compositions containing PVC having excellent transparency have heretofore been used. These transparent PVC tubes usually contain plasticizers to improve flexibility because they have poor flexibility although they have excellent transparency. These plasticizers, however, ooze out, causing problems such as contamination of the surface of equipment, or transferring into insulated wires which are covered with the tube. Thus, heat-shrinkable tubes not containing a plasticizer, i.e., of so-called unplasticized type, have been desired. However, there has not yet been discovered a satisfactory heat-shrinkable tube of the unplasticized type. For example, a polyethylene (PE) resin which is a typical example of unplasticized resins is inferior in flame-retardant properties and transparency, and an ethylene-vinyl acetate copolymer (EVA) is inflammable although it has excellent transparency. However, addition of a flame retardant to EVA results in the loss of transparency.

SUMMARY OF THE INVENTION

The principal object of the invention is to provide unplasticized heat-shrinkable tubes having excellent flame-retardant properties and transparency.

The present invention, therefore, relates to a heat-shrinkable tube which is prepared by molding a resin composition in a tubular form, irradiating the tube with electron rays to cross-link it, and expanding the cross-linked tube. The resin composition contains a base polymer composition consisting of from 5 to 80% by weight of a graft copolymer and 95 to 20% by weight of chlorinated polyethylene having a crystal proportion of 1 to 25%. The graft copolymer is prepared by graft-copolymerizing polyvinyl chloride to an ethylene-vinyl acetate copolymer containing a vinyl acetate content of at least 50% by weight.

DETAILED DESCRIPTION OF THE INVENTION

As described hereinbefore, an EVA resin which is an unplasticized resin is inflammable although it has excellent transparency. The addition of a flame retardant to improve its flame-retardant properties leads to the loss of transparency. Other unplasticized polymers include chlorinated polyethylene which is a polymer containing halogen as is the same with PVC, and a graft copolymer prepared by grafting PVC to EVA. It has been found, however, that a heat-shrinkable tube made of chlorinated polyethylene has poor transparency although it has flame-retardant properties, and that a heat-shrinkable tube made of the above-described graft copolymer alone cannot hold its tubular form although it has excellent transparency and flame-retardant properties.

It has further been found that, of various graft copolymers as described hereinbefore, a graft copolymer prepared using an EVA resin in which the vinyl acetate (VA) content is less than 50% is turbid and is not transparent. However, a heat-shrinkable tube made of a resin composition containing a base polymer composition consisting of from 5 to 80%, preferably 10 to 50%, by weight of a graft copolymer and 95 to 20%, preferably 90 to 50%, by weight of chlorinated polyethylene having a crystallinity of 1 to 25%, said graft copolymer being prepared by grafting PVC to EVA having a VA content of at least 50%, preferably about 60%, can maintain its tubular form and, furthermore, has excellent flame-retardant properties and transparency.

Heat-shrinkable tubes are produced by expanding tubes at higher temperatures than the softening temperature or melting point thereof and, thereafter, cooling the tubes while maintaining in the expanded form. However, at temperatures higher than the softening temperature or melting point, the resin used melts and, therefore, the tubes cannot be expanded. Thus, cross-linking is performed in such a manner that the resin does not melt. Cross-linking methods include chemical cross-linking and cross-linking by irradiation with radiations. The chemical cross-linking, however, gives rise to the problem that the above-described resin composition is seriously colored since cross-linking is achieved at high temperatures. In the invention, therefore, the cross-linking by irradiation with radiations is most suitable becuase it does not cause serious coloration.

In order to improve the cross-linking efficiency of the resin composition of the invention, it is preferred to add a polyfunctional monomer or monomers as cross-linking aids. The reason for this is that the addition of such functinal monomers permits cross-linking of the resulting resin composition with smaller amounts of irradiation than for resin compositions not containing such polyfunctional monomers, leading to further reduction in coloration due to irradiation.

Any polyfunctional monomers that have two or more reactive double bonds in the molecule can be used in the present invention.

Polyfunctional monomers which can be used include acrylates, e.g., diethylene glycol diacrylate, dimethacrylates, e.g., diethylene glycol dimethacrylate, and dipropylene glycol dimethacrylate, triacrylates, e.g., trimethylolethane triacrylate, and trimethylolpropane triacrylate, trimethacrylates, e.g., trimethylolethane triacrylate, and trimethylolpropane trimethacrylate, ...allyl cyanurate, triacyl isocyanurate, diallyl maleate, and diallyl maleate.

Of these, monomers having 3 or more reactive double bonds in the molecule are preferred since they can crosslink the resin composition with less amount as compared when using monomers having two reactive double bonds.

The amount of the polyfunctional monomer used in the present invention depends on the number of the reactive double bonds contained in the monomer and generally is 3 to 20 parts by weight, preferably 5 to 10 parts by weight per 100 parts by weight of the base polymer composition. When the polyfunctional monomer is contained in an amount of less than 3 parts by weight per 100 parts by weight of the base polymer composition, the efficiency of cross-linking by irradiation is unsatisfactory. On the other hand, more than 20 parts by weight per 100 parts by weight of the base polymer composition leads to deterioration of the flexibility of the resin composition.

Chlorinated polyethylene and an EVA-PVC graft copolymer per se are flame-retardant because they contain halogen in the polymer.

With heat-shrinkable tubes made of the above-described resinous elements alone, however, their flame-retardant properties are insufficient to pass the vertical burning test as specified in UL Standards (UL-224) although they are sufficient to pass the horizontal burning test specified in the same standards. In order to provide the more excellent flame-retardant properties of (UL-224), it is necessary to add a flame-retardant to the resin composition. As a result of extensive investigations on various flame-retardants such as decabromo diphenyl ether, chlorinated paraffin, and antimony trioxide deteriorate transparency although they greatly improve flame-retardant properties. It has also been found that liquid flame-retardants such as phosphoric acid esters and halogenated phosphoric acid esters cannot be used because they cannot improve flame-retardant properties to high levels and give rise to the problem that they keep out into the surface of the tube, although they provide good transparency. In addition, it has been found that the use of 2,2-di(4-bromoethoxy-3,5-dibromophenyl)propane leads to the production of a heat-shrinkable tube which has excellent transparency, is completely free from oozing, and has sufficient flame-retardant properties to pass the UL vertical burning test.

The wall thickness of the heat-shrinkable tubes may be chosen appropriately depending on purposes and according to standards accepted in the art, e.g., MIL and UL 224 standards.

The invention will be illustrated in greater detail with reference to the following examples showing its preferred embodiment but it is not limited thereto.

EXAMPLES 1 TO 3

In these examples, Compositions 1, 2 and 3 as shown in Table 1 were used. Each resin composition was extrusion-molded to provide a tube having an inner diameter of 2.4 mm and a thickness of 0.51 mm. The tube was irradiated in an amount of 5 Mrad by the use of a 1 Mev electron ray accelerator and, thereafter, by the usual method (in which a tube is heated to a temperature higher than the softening point thereof and the inner pressure and/or the pressure about the tube is reduced), the tube was expanded to an inner diameter of 4.8 mm and then cooled to prepare a heat-shrinkable tube.

The thus-prepared heat-shrinkable tube was allowed to stand at 50° C. for one week. After one week, the change in the diameter was measured and horizontal and vertical burning tests were performed to examine flame-retardant properties. Transparency was evaluated as follows:

Each resin composition was molded into a 2 mm thick sheet, which was then irradiated in an amount of 5 Mrad by the use of a 1 Mev electron ray accelerator. The sheet thus irradiated was placed on paper on which a letter (No. 4 type) had been printed, and the sharpness of the letter was compared.

The results are shown in Table 2. It can be seen from the results that, in any of Examples 1 to 3, there can be obtained a heat-shrinkable tube having excellent transparency and flame-retardant properties.

COMPARATIVE EXAMPLES 1 TO 4

In these comparative examples, Compositions 4 to 7 as shown in Table 1 were used. Each resin composition was molded into a tube having the same size as in Examples 1 to 3, and the tube was treated in the same manner as in Examples 1 to 3 to produce a heat-shrinkable tube. With the thus-produced heat-shrinkable tube, storage stability, flame-retardant properties, and transparency were evaluated in the same manner as in Examples 1 to 3.

The results are shown in Table 2. It can be seen from the results that the heat-shrinkable tubes of Comparative Examples 1 and 3 do not have transparency at all although they have good flame-retardant properties and storage stability; the heat-shrinkable tube of Comparative Example 2 is poor in respect of storage stability although it has good transparency and flame-retardant properties, and it cannot hold its tubular form; and that the heat-shrinkable tube of Comparative Example 4 has poor transparency although it has good flame-retardant properties and storage stability because it is prepared using an EVA-PVC graft copolymer in which EVA having a VA content of less than 50% is used.

TABLE 1

| | Resin Composition (Unit: parts by weight) | | | | | | |
|---|---|---|---|---|---|---|---|
| | 1 | 2 | 3 | 4 | 5 | 6 | 7 |
| Evathlene K4545[1] | 10 | 20 | 20 | — | 100 | 20 | — |
| Sumigraft GF[2] | | | | | | | 20 |
| Elaslene 30B[3] | 90 | 80 | 80 | 100 | — | 80 | 80 |
| TAIC[4] | 5 | | | | | | |
| TMPTMA[5] | — | 5 | 10 | 5 | 5 | 10 | 5 |
| DEDPO[6] | — | — | — | — | — | 10 | — |
| H.B.[7] | — | — | 10 | — | 10 | — | 10 |

Note:
[1]Ethylene-vinyl acetate-polyvinyl chloride graft copolymer (vinyl acetate content of ethylene-vinyl acetate copolymer: about 60% by weight; produced by Dainippon Ink Manufacturing Co., Ltd.)
[2]Ethylene-vinyl acetate-polyvinyl chloride graft copolymer (vinyl acetate content of ethylene-vinyl acetate copolymer: 20 to 40%; produced by Sumitomo Chemical Co., Ltd.)
[3]Chlorinated polyethylene (crystal content: 20%; produced by Showa Denko K.K.)
[4]Triallyl isocyanurate (cross-linking aid)
[5]Trimethylolpropane trimethacrylate (cross-linking aid)
[6]Decabromodiphenyl oxide (flame-retardant)
[7]2,2-Di(4-bromoethoxy-3,5-dibromophenyl)propane (flame retardant)

TABLE 2

| | Example | | | Comparative Example | | | |
|---|---|---|---|---|---|---|---|
| | 1 | 2 | 3 | 1 | 2 | 3 | 4 |
| Transmittance | 87.5 | 88.3 | 88.6 | 82.5 | 87.3 | 0.0 | 80.3 |
| Resin Composition | 1 | 2 | 3 | 4 | 5 | 6 | 7 |
| Storage Stability (change in diameter | −2 | −2 | −2 | −1 | −15 | −2 | −5 |

TABLE 2-continued

|  | Example | | | Comparative Example | | | |
| --- | --- | --- | --- | --- | --- | --- | --- |
|  | 1 | 2 | 3 | 1 | 2 | 3 | 4 |
| (%))[1] Flame-Retardant Properties[2] | A | A | B | A | B | B | B |
| Transparency[3] | a | a | a | b | a | c | b |

Note:
[1]Change in inner diameter after being allowed to stand at 50° C. for one week. The symbol (−) indicates that the inner diameter is decreased, and the symbol (+) indicates that the inner diameter is increased.
[2]A Pass horizontal burning test.
B Pass vertical burning test.
[3]a Letter can be seen clearly.
b Letter can be seen vaguely.
c Letter cannot be seen at all.

The above transmittance values were obtained using 0.1 mm thick sheets molded from Resin Compositions 1–7.

As will be apparent from Tables 1 and 2, the resin composition No. 4 (Comparative Example 1) contains a chlorinated polyethylene having a crystallinity of 20% as a component of the base polymer composition and has poor transparency because of its crystallinity. The resin composition No. 5 (Comparative Example 2) whose base polymer composition is non-crystalline showed poor storage stability in its size and therefore proved unsuitable for heat-shrinkable tubes. On the other hand, the resin compositions Nos. 1 and 2 (Examples 3 and 4) are excellent in transparency and storage stability in size.

Further, the resin composition No. 6 (Comparative Example 3) contains a turbid flame-retardant and it provides turbid heat-shrinkable tubes although they have sufficient flame retardancy. The resin composition No. 7 (Comparative Example 4) whose base polymer composition contains a graft copolymer having a VA content of less than 50% by weight gives rise to heat-shrinkable tubes having poor transparency since the graft copolymer in itself is opaque. On the contrary, the resin composition No. 3 (Example 3) gives rise to heat-shrinkable tubes having excellent transparency, storage stability in size and flame retardancy.

While the invention has been described in detail and with reference to specific embodiment thereof, it will be apparent to one skilled in the art that various changes and modifications can be made therein without departing from the spirit and scope thereof.

What is claimed is:

1. A heat-shrinkable tube prepared by molding a resin composition in a tubular form, irradiating the tube with electron rays to cross-link it, and expanding the cross-linked tube, the resin composition comprising a base polymer composition consisting of from 5 to 80% by weight of a graft copolymer, and 95 to 20% by weight of chlorinated polyethylene having a crystallinity of from 1 to 25%, said graft copolymer being prepared by graft-copolymerizing polyvinyl chloride to an ethylene-vinyl acetate copolymer having a vinyl acetate content of at least 50% by weight.

2. The heat-shrinkable tube as claimed in claim 1, wherein said resin composition contains 10 to 50% by weight of the graft copolymer.

3. The heat-shrinkable tube as claimed in claim 1, wherein said resin composition contains 10 to 20% by weight of the graft copolymer.

4. The heat-shrinkable tube as claimed in claim 1, wherein said graft copolymer has a vinyl acetate content of about 60%.

5. The heat-shrinkable tube as claimed in claim 1, wherein the resin composition further contains a polyfunctional monomer.

6. The heat-shrinkable tube as claimed in claim 5, wherein said polyfunctional monomer has 3 or more reactive double bonds.

7. The heat-shrinkable tube as claimed in claim 6, wherein said polyfunctional monomer is selected from the group consisting of a triacrylate, a trimethacrylate, a triacryl cyanurate and a triacyl isocyanurate.

8. The heat-shrinkable tube as claimed in claim 5, wherein said polyfunctional monomer is contained in an amount of 3 to 20 parts by weight per 100 parts by weight of the base polymer composition.

9. The heat-shrinkable tube as claimed in claim 8, wherein said polyfunctional monomer is contained in an amount of 5 to 10 parts by weight per 100 parts by weight of the base polymer composition.

10. The heat-shrinkable tube as claimed in claim 1, wherein the resin composition further contains 2,2-di(4-bromoethoxy-3,5-dibromophenyl)propane.

11. The heat-shrinkable tube as claimed in claim 10, wherein said 2,2-di(4-bromoethoxy-3,5-dibromophenyl)propane is contained in an amount of 10 parts by weight per 100 parts by weight of the base polymer composition.

* * * * *